United States Patent
Zhao et al.

(10) Patent No.: US 10,812,234 B2
(45) Date of Patent: Oct. 20, 2020

(54) INTERLEAVER-BASED METHOD AND APPARATUS FOR ENHANCING CAPACITY OF A RANDOM ACCESS CHANNEL

(71) Applicant: Beijing University of Posts and Telecommunications, Beijing (CN)

(72) Inventors: Zhongyuan Zhao, Beijing (CN); Mugen Peng, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 16/255,927

(22) Filed: Jan. 24, 2019

(65) Prior Publication Data
US 2019/0238289 A1 Aug. 1, 2019

(30) Foreign Application Priority Data
Jan. 26, 2018 (CN) .......................... 2018 1 0079571

(51) Int. Cl.
*H04L 5/00* (2006.01)
*H04W 74/08* (2009.01)

(52) U.S. Cl.
CPC ....... *H04L 5/0048* (2013.01); *H04W 74/0833* (2013.01)

(58) Field of Classification Search
None
See application file for complete search history.

(56) References Cited

U.S. PATENT DOCUMENTS

| 2009/0041240 A1* | 2/2009 | Parkvall | H04W 72/02 380/247 |
| 2020/0015276 A1* | 1/2020 | Reial | H04W 72/0446 |
| 2020/0029366 A1* | 1/2020 | Xiong | H04W 74/0833 |

FOREIGN PATENT DOCUMENTS

| CN | 103023618 A | 4/2013 |
| CN | 107370702 A | 11/2017 |
| CN | 107466112 A | 12/2017 |

OTHER PUBLICATIONS

Non-Final Office Action from Chinese application No. 201810079571.7, dated Mar. 25, 2020, all pages cited in its entirety.

(Continued)

*Primary Examiner* — Saumit Shah
(74) *Attorney, Agent, or Firm* — Burr & Forman, LLP

(57) ABSTRACT

The embodiments of the present invention provide an interleave-based method and apparatus for enhancing capacity of a random access channel, wherein the method is applied to a terminal device. The method includes: receiving a set of preamble sequences and at least two interleavers sent by a base station; determining, when a random access is triggered, a to-be-used preamble sequence from the set of preamble sequences as a target preamble sequence, and randomly determining a to-be-used interleaver from the at least two interleavers as a target interleaver; performing interleaving processing on the target preamble sequence by using the target interleaver to generate an interleaved target preamble sequence, wherein, performing interleaving processing on the same preamble sequence by using different interleavers will generate different interleaved preamble sequences; sending a random access request to the base station by using the interleaved target preamble sequence. Applying the embodiments of the present invention can increase the number of available preamble sequences and increase the capacity of the PRACH.

9 Claims, 6 Drawing Sheets

(56) References Cited

OTHER PUBLICATIONS

Hui Song, Detection Algorithm on Preamble Signal of LTE Random Access Channel, dated Mar. 11, 2015.

* cited by examiner

INTERLEAVER-BASED METHOD AND APPARATUS FOR ENHANCING CAPACITY OF A RANDOM ACCESS CHANNEL

CROSS-REFERENCE TO RELATED APPLICATIONS

The present application claims the priority to a Chinese Patent Application No. 201810079571.7, filed with the China National Intellectual Property Administration on Jan. 26, 2018 and entitled "Interleaver-based method and apparatus for enhancing capacity of a random access channel", which is incorporated herein by reference in its entirety.

TECHNICAL FIELD

The present invention relates to the field of computer technologies, and in particular, to an interleaver-based method and apparatus for enhancing capacity of a random access channel.

BACKGROUND

In order to meet the requirements of 5G network capacity, faster data rate, lower end-to-end delay and large-scale device connection, a new wireless (NewRadio, NR) technology is proposed. The NR technology includes initial access technology, large-scale multi-antenna technology, multiple access technology and channel coding technology. The Physical Random Access Channel (PRACH) is an important part of the initial access. Its role is to perform random access, which is used to control the user's initial connection, handover, connection reestablishment, and uplink synchronization.

The specific process of a terminal device accessing a base station through the PRACH is as follows:

In the first step, the base station generates preamble sequences and groups the preamble sequences to generate a plurality of sets of preamble sequences.

In the second step, the base station allocates a plurality of sets of preamble sequences to each terminal device.

In the third step, when a random access is triggered, the terminal device determines a set of to-be-used target preamble sequences from the sets of preamble sequences allocated by the base station, and randomly determines a target preamble sequence from the set of target preamble sequences.

In the fourth step, the terminal device sends a random access request to the base station by using the target preamble sequence.

In the fifth step, the base station receives the random access request sent by the terminal device, and obtains the target preamble sequence from the random access request.

In the sixth step, the base station determines whether the target preamble sequence is a preamble sequence used by another terminal device that has accessed the base station.

In the seventh step, when the target preamble sequence is a preamble sequence used by another terminal device, the terminal device is not allowed to access, and when the target preamble sequence is not used, correlation detection is further performed on the received target preamble sequence. If the correlation detection is passed, the terminal device is allowed to access; if the correlation detection fails, the terminal device is not allowed to access.

Since the correlation between the same preamble sequences is strong, in order to avoid mutual influence, the same preamble sequence can only be used by one terminal device. If the target preamble sequence carried in the random access request sent by a terminal device subsequently accessed to the base station is a used preamble sequence, the base station does not allow the terminal device to access. It can be seen that the greater the number of different preamble sequences, the larger the capacity of the PRACH, and the more terminal devices are allowed to access. Accordingly, for a single terminal device, the success rate of access is higher.

However, with the development of the service, the 5G network requires a higher PRACH capacity. And due to the limited space of the PRACH, the number of preamble sequences in the set of preamble sequences sent by the base station to the terminal device is also limited, resulting in a scenario in which a large number of users initiate access, there may be a problem that the success rate of the user access is reduced due to the insufficient number of preamble sequences, which affects the user experience.

SUMMARY

An object of the embodiments of the present invention is to provide an interleave-based method and apparatus for enhancing capacity of a random access channel, so as to increase the number of available preamble sequences and increase the capacity of the PRACH. The specific technical solutions are as follows:

According to first aspect, an embodiment of the present invention provides an interleave-based method for enhancing capacity of a random access channel, applied to a terminal device. The method includes:

receiving a set of preamble sequences and at least two interleavers sent by a base station;

determining, when a random access is triggered, a to-be-used preamble sequence from the set of preamble sequences as a target preamble sequence, and randomly determining a to-be-used interleaver from the at least two interleavers as a target interleaver;

performing interleaving processing on the target preamble sequence by using the target interleaver to generate an interleaved target preamble sequence, wherein, performing interleaving processing on the same preamble sequence by using different interleavers will generate different interleaved preamble sequences;

sending a random access request to the base station by using the interleaved target preamble sequence, where the random access request carries a preamble sequence for accessing the base station.

Optionally, a correlation peak between the interleaved preamble sequences generated after performing interleaving processing on the same preamble sequence by using different interleavers is smaller than a preset correlation peak threshold.

Optionally, sending a random access request to the base station by using the interleaved target preamble sequence comprises:

sending a random access request carrying a preamble sequence for accessing the base station to the base station, where the preamble sequence for accessing the base station is the interleaved target preamble sequence; or performing a time-frequency resource mapping on the interleaved target preamble sequence to generate a random access channel subframe, and sending a random access request carrying a preamble sequence for accessing the base station to the base station, where the preamble sequence for accessing the base station is the random access channel subframe.

According to second aspect, an embodiment of the present invention provides an interleave-based method for enhancing capacity of a random access channel, applied to a base station. The method is includes:

sending a set of preamble sequences and at least two interleavers to a terminal device;

receiving a random access request sent by the terminal device, where the random access request carries a preamble sequence for accessing the base station;

acquiring the preamble sequence for accessing the base station from the random access request, where the preamble sequence for accessing the base station is obtained by using an interleaved preamble sequence, the interleaved preamble sequence is obtained by performing interleaving processing on a target preamble sequence by using one of the at least two interleavers, and the target preamble sequence is a preamble sequence in the set of preamble sequences;

determining that the accessing of the terminal device is not allowed, when the preamble sequence for accessing the base station is a preamble sequence used by another terminal device that has accessed the base station.

Optically, the method further comprises:

performing correlation detection on the preamble sequence for accessing the base station, when the preamble sequence for accessing the base station is not a preamble sequence used by another terminal device that has accessed the base station;

enabling the accessing of the terminal device, if the correlation detection passes.

Optically, the preamble sequence for accessing the base station is the interleaved target preamble sequence;

performing correlation detection on the preamble sequence for accessing the base station comprises:

selecting a de-interleaver from the de-interleavers respectively corresponding to the at least two interleavers as a target de-interleaver;

performing de-interleaving processing on the interleaved target preamble sequence by using the target de-interleaver as selected to obtain the target preamble sequence;

performing correlation detection on the target preamble sequence.

Optically, the preamble sequence for accessing the base station is a random access channel subframe generated by performing time-frequency resource mapping on the interleaved target preamble sequence;

performing correlation detection on the preamble sequence for accessing the base station comprises:

performing a time-frequency resource de-mapping on the preamble sequence for accessing the base station to obtain the interleaved target preamble sequence;

selecting a de-interleaver from de-interleavers respectively corresponding to the at least two interleavers as a target de-interleaver;

performing de-interleaving processing on the interleaved target preamble sequence by using the target de-interleaver as selected to obtain the target preamble sequence;

performing correlation detection on the target preamble sequence.

Optically, the interleaver comprises a nested interleaver and the interleaver is generated by performing the following steps:

generating a mother interleaver and a mother de-interleaver corresponding to the mother interleaver;

generating a new interleaver by nesting based on the mother interleaver;

generating a new de-interleaver by nesting based on the mother de-interleaver.

According to third aspect, an embodiment of the present invention provides an interleave-based apparatus for enhancing capacity of a random access channel, applied to a terminal device, and the apparatus includes:

a first receiving unit, configured to receive a set of preamble sequences and at least two interleavers sent by a base station;

a first determining unit, configured to determine, when a random access is triggered, a to-be-used preamble sequence from the set of preamble sequences as a target preamble sequence, and randomly determine a to-be-used interleaver from the at least two interleavers as a target interleaver;

an interleaving unit, configured to perform interleaving processing on the target preamble sequence by using the target interleaver to generate an interleaved target preamble sequence, wherein, performing interleaving processing on the same preamble sequence by using different interleavers will generate different interleaved preamble sequences;

a first sending unit, configured to send a random access request to the base station by using the interleaved target preamble sequence, where the random access request carries a preamble sequence for accessing the base station.

According to fourth aspect, an embodiment of the present invention provides an interleaver-based apparatus for enhancing capacity of a random access channel, applied to a base station, and the apparatus includes:

a second sending unit, configured to send a set of preamble sequences and at least two interleavers to the terminal device;

a second receiving unit, configured to receive a random access request sent by the terminal device, where the random access request carries a preamble sequence for accessing the base station;

an acquiring unit, configured to acquire the preamble sequence for accessing the base station from the random access request, where the preamble sequence for accessing the base station is obtained by performing interleaving processing on a target preamble sequence by using one of the at least two interleavers, and the target preamble sequence is a preamble sequence in the set of preamble sequences;

a second determining unit, configured to determine that the accessing of the terminal device is not allowed, when the preamble sequence for accessing the base station is a preamble sequence used by another terminal device that has accessed the base station.

The interleave-based method and apparatus for enhancing capacity of a random access channel provided by the embodiments of the present invention are applied to the terminal device. First, a set of preamble sequences and at least two interleavers sent by the base station are received; when a random access is triggered, a preamble sequence to be used is determined from the set of preamble sequences as a target preamble sequence, and an interleaver to be used is randomly determined from at least two interleavers as a target interleaver; and then a target interleaver is used to perform interleaving processing on the target preamble sequence to generate an interleaved target preamble sequence. It should be noted that, performing interleaving processing on the same preamble sequence by using different interleavers will generate different interleaved preamble sequences. Finally, the interleaved target preamble sequence is used to send a random access request to the base station, where the random access request carries a preamble sequence for accessing the base station.

In this way, the present invention can generate a plurality of different interleaved preamble sequences from the same preamble sequence by performing interleaving processing on the preamble sequence, thus achieving the technical effect of generating more different preamble sequences by a limited preamble sequence, such that the base station can access more terminal devices and improve the capacity of the PRACH, even in a scenario where a large number of users initiate access, the problem of reducing the success rate of user access due to insufficient number of available preamble sequences can be avoided, and the user experience is improved. Of course, implementing any of the products or methods of the present invention does not necessarily require all of the advantages described above to be achieved at the same time.

BRIEF DESCRIPTION OF THE DRAWINGS

In order to more clearly illustrate the embodiments of the present invention or the technical solutions in the prior art, the drawings used in the embodiments or the description of the prior art will be briefly described below.

DETAILED DESCRIPTION

Figure 1:
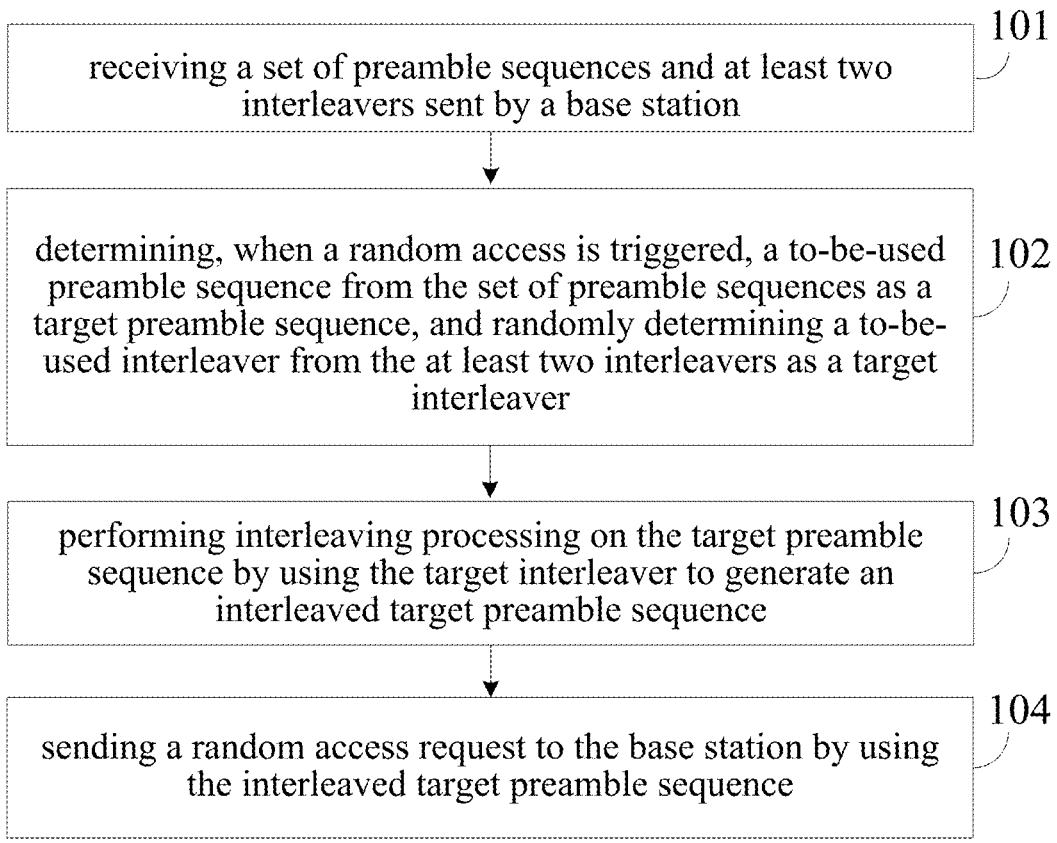
FIG. 1 is a flowchart of an interleave-based method for enhancing capacity of a random access channel according to an embodiment of the present invention.

The technical solutions in the embodiments of the present invention will be described below with reference to the accompanying drawings in the embodiments of the present invention.

In order to meet the requirements of 5G network capacity, faster data rate, lower end-to-end delay and large-scale device connection, a new wireless (NewRadio, NR) technology is proposed. The NR technology includes initial access technology, large-scale multi-antenna technology, multiple access technology and channel coding technology. The Physical Random Access Channel (PRACH) is an important part of the initial access. Its role is to perform random access, which is used to control the user's initial connection, handover, connection reestablishment, and uplink synchronization.

The specific process of a terminal device accessing a base station through the PRACH is as follows:

In the first step, the base station generates preamble sequences and groups the preamble sequences to generate a plurality sets of preamble sequences.

In the second step, the base station allocates a plurality sets of preamble sequences to each terminal device.

In the third step, when a random access is triggered, the terminal device determines a set of target preamble sequences to be used from the sets of preamble sequences allocated by the base station, and randomly determines a target preamble sequence from the set of target preamble sequences.

In the fourth step, the terminal device sends a random access request to the base station by using the target preamble sequence.

In the fifth step, the base station receives the random access request sent by the terminal device, and obtains the target preamble sequence from the random access request.

In the sixth step, the base station determines whether the target preamble sequence is a preamble sequence used by another terminal device that has accessed the base station.

In the seventh step, when the target preamble sequence is a preamble sequence used by another terminal device, the terminal device is not allowed to access, and when the target preamble sequence is not used, correlation detection is further performed on the received target preamble sequence. If the correlation detection is passed, the terminal device is allowed to access; if the correlation detection fails, the terminal device is not allowed to access.

Since the correlation between the same preamble sequences is strong, in order to avoid mutual influence, the same preamble sequence can only be used by one terminal device. If the target preamble sequence carried in the random access request sent by a terminal device subsequently accessed, to the base station is a used preamble sequence, the base station does not allow the terminal device to access. It can be seen that the greater the number of different preamble sequences, the larger the capacity of the PRACH, and the more terminal devices are allowed to access. Accordingly, for a single terminal device, the success rate of access is higher.

However, with the development of the service, the 5G network requires a higher PRACH capacity. And due to the limited space of the PRACH, the number of preamble sequences in the preamble sequence set sent by the base station to the terminal device is also limited, resulting in a scenario in which a large number of users initiate access, there may be a problem that the success rate of the user access is reduced due to the insufficient number of preamble sequences, which affects the user experience.

In order to solve the above problem, the interleave-based method and apparatus for enhancing capacity of a random access channel according to the embodiments of the present invention can generate a plurality of different interleaved preamble sequences from the same preamble sequence by performing interleaving processing on the preamble sequence, thus achieving the technical effect of generating more different preamble sequences by a limited preamble sequence, such that the base station can access more terminal devices and improve the capacity of the PRACH, even in a scenario where a large number of users initiate access, the problem of reducing the success rate of user access due to insufficient number of available preamble sequences can be avoided, and the user experience is improved.

An embodiment of the invention provides an interleave-based method for enhancing capacity of a random access channel, which is applied to a terminal device. Referring to FIG. 1, FIG. 1 is a flowchart of an interleave-based method for enhancing capacity of a random access channel according to an embodiment of the present invention, including the following steps:

Step 101: receiving a set of preamble sequences and at least two interleavers sent by a base station.

In this step, the terminal device receives the set of preamble sequences and at least two interleavers from the base station to perform interleaving processing on the preamble sequences by using the interleavers to generate a plurality of different preamble sequences, thereby improving the capacity of PRACH.

The interleavers are generated by the base station, and may be nested interleavers, or may be other types of interleavers, such as a random interleaver, a quadratic congruent interleaver, a packet interleaver, etc., which is not limited by the present invention.

Generally, there are a plurality of sets of preamble sequences. For example, in the process of competitive random access, the sets of preamble sequences may include a set of preamble sequence A and a set of preamble sequence B, where the set of preamble sequence B is applied to a scenario where the Message3 (Msg3) is large and the path loss is small, and the set of preamble sequence A is applied to a scenario where the Msg3 is small or the path loss is large.

Step 102: determining, when a random access is triggered, a to-be-used preamble sequence from the set of preamble sequences as a target preamble sequence, and randomly determining a to-be-used interleaver from the at least two interleavers as a target interleaver.

In this step, when a random access to a terminal device is triggered, the terminal device may determine a set of preamble sequences from the plurality sets of preamble sequences as received according to the value of the Msg3 to be sent and the value of the path loss, and further determine from the determined set of preamble sequences, a to-be-used preamble sequence, that is, a target preamble sequence; the terminal device may further randomly determine, a to-be-used interleaver, that is, a target interleaver, from the at least two interleavers as received, thus perform the subsequent step that performing interleaving processing on the target preamble sequence by using the target interleaver.

Step 103: performing interleaving processing on the target preamble sequence by using the target interleaver to generate an interleaved target preamble sequence.

Performing interleaving processing on the same preamble sequence by using different interleavers will generate different interleaved preamble sequences.

In this step, after the terminal device determines the target preamble sequence and the target interleaver through step 102, the target interleaver may be used to perform interleaving processing on the target preamble sequence to generate an interleaved target preamble sequence; it should be noted that for the same preamble sequence, when interleaved with different interleavers, the generated interleaved preamble sequences are also different, so that more different interleaved preamble sequences can be generated from the limited preamble sequence, so that more terminal devices can access the base station using the interleaved preamble sequence to improve the capacity of the PRACH.

It should be noted that, performing interleaving processing on the data by using an interleaver may specifically means that the data may be replaced according to the sequence and then read out, based on the interleave matrix and the replacement rule corresponding to the interleaver. Taking a random interleaver as an example, the principle is to use a random permutator and map the input sequence in permutation order. For example, if there is a preamble sequence of length N, then the interleaved position is randomly selected in the position sequence $\{1, 2, \ldots, N\}$. Different random interleavers can design different permutation rules to distinguish different users.

Therefore, even for the same preamble sequence, a plurality of interleaved preamble sequences generated after interleaving by different interleavers are different, and the correlation between them is also poor.

In an implementation manner, a correlation peak between the interleaved preamble sequences generated after performing interleaving processing on the same preamble sequence by using different interleavers is smaller than a preset correlation peak threshold.

Specifically, for the same preamble sequence, the correlation peak between the plurality of interleaved preamble sequences generated after interleaving by different interleavers may be smaller than a preset correlation peak threshold. When the correlation peak between the two preamble sequences is less than the preset correlation peak threshold, the two terminal devices may be allowed to use the two preamble sequences respectively, and the two preamble sequences do not interfere with each other.

Step 104: sending a random access request to the base station by using the interleaved target preamble sequence.

The random access request carries a preamble sequence for accessing the base station.

In this step, the terminal device may use the interleaved target preamble sequence to send a random access request to the base station to access the base station.

In an implementation manner, step 104 may include:

sending a random access request carrying a preamble sequence for accessing the base station to the base station, where the preamble sequence for accessing the base station is the interleaved target preamble sequence; or performing a time-frequency resource mapping on the interleaved target preamble sequence to generate a random access channel subframe, and sending a random access request carrying a preamble sequence for accessing the base station to the base station, where the preamble sequence for accessing the base station is the random access channel subframe.

Specifically, the terminal device may send a random access request that carries the interleaved target preamble sequence to the base station, or the terminal device may first perform time-frequency resource mapping on the interleaved target preamble sequence to generate a random access channel subframe, and then a random access request carrying a random access channel subframe is sent to the base station to request access to the base station.

It should be noted that the foregoing processing may refer to the prior art, and details are not described herein again.

It can be seen that, in the interleave-based method for enhancing capacity of a random access channel provided by the embodiment of the present invention, the terminal device can generate a plurality of different interleaved preamble sequences from the same preamble sequence by performing interleaving processing on the preamble sequence, thus achieving the technical effect of generating more different preamble sequences by a limited preamble sequence, such that the base station can access more terminal devices and improve the capacity of the PRACH, even in a scenario where a large number of users initiate access, the problem of reducing the success rate of user access due to insufficient number of available preamble sequences can be avoided, and the user experience is improved.

Figure 2:
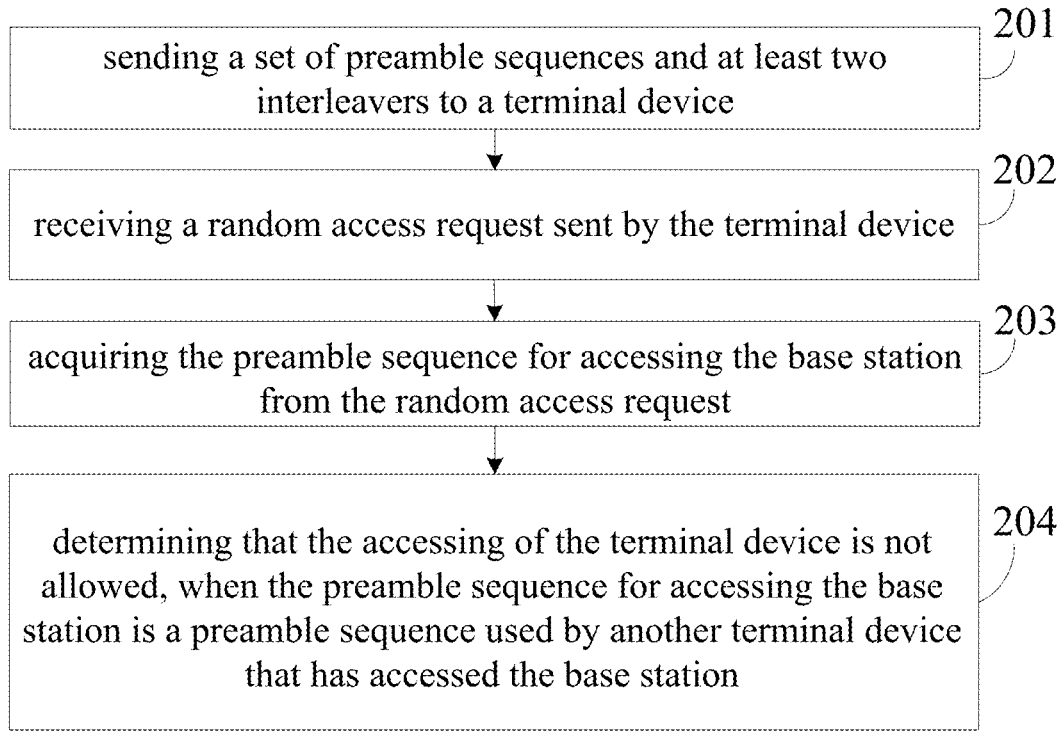
FIG. 2 is another flowchart of an interleave-based method for enhancing capacity of a random access channel according to an embodiment of the present invention.

An embodiment of the invention further provides an interleave-based method for enhancing capacity of a random access channel, which is applied to a base station. Referring to FIG. 2, FIG. 2 is still another flowchart of an interleave-based method for enhancing capacity of a random access channel according to an embodiment of the present invention, including the following steps:

Step 201: sending a set of preamble sequences and at least two interleavers to a terminal device.

In this step, the base station may notify a plurality of sets of preamble sequences and at least two interleavers provided to the terminal device for use, to the terminal device residing in the cell through a system message, so that the terminal device determines a set of preamble sequences and a target interleaver to be used such that the terminal device can perform interleaving processing on the target preamble sequence as determined from the set of preamble sequences by using the target interleaver. The embodiment of the present invention is described by taking a contention random access procedure as an example.

It should be noted that, before step 201, the base station may generate a plurality of preamble sequences in advance, and group the generated preamble sequences into a plurality of sets of preamble sequences. Here, generation of (Zadoff-Chu, ZC) sequence is taken as an example for description.

The ZC sequence can be generated according to formula (1):

$$x_u(n) = e^{-j\frac{\pi u n(n+1)}{N_{ZC}}}, 0 \leq n \leq N_{ZC} - 1 \quad (1)$$

In formula (1), $N_{ZC}$ represents the length of the ZC sequence, u represents the root index number of the ZC sequence, and the value of u should be less than $N_{ZC}$; $x_u(n)$ represents the ZC sequence generated when the root index number is u.

In addition, before step 201, the base station may also generate N pairs of mutually different interleavers $I_i$, and deinterleavers $D_i$ corresponding to the interleavers $I_i$, i=1, 2, . . . , N, and the N pairs of mutually different interleavers $I_i$, and deinterleaver $D_i$ may represent as $\{(I_1, D_1), (I_2, D_2), \ldots, (I_N, D_N)\}$.

In one implementation, the interleaver includes a nested interleaver; the interleaver is generated by performing the following steps:

generating a mother interleaver and a mother deinterleaver corresponding to the mother interleaver;

generating a new interleaver by nesting based on the mother interleaver;

generating a new de-interleaver by nesting based on the mother de-interleaver.

Specifically, in the first step, a mother interleaver $I_A$ is generated, and the mother interleaver $I_A$ may interleave a preamble sequence of length M (M≥N) and generate a mother de-interleaver $D_A$ corresponding to the mother interleaver $I_A$.

In the second step, the first pair of interleaver $I_1$ and the de-interleaver $D_1$ are generated, and it is defined that $I_1=I_A$ and $D_1=D_A$.

In the third step, the remaining N−1 pairs of interleavers and de-interleavers are generated by using nested interleaving. When the nth (N≥n≥1) pair of interleaver and the de-interleaver $D_n$ are generated, the n−1th pair is interleaved. The nth pair of interleaver $I_n$ and the de-interleaver $D_n$ can be obtained by passing the (n−1)th pair of interleaver $I_{n-1}$ and de-interleaver $D_{n-1}$ through the mother interleaver $I_A$ and the corresponding mother de-interleaver $D_A$, respectively.

It should be noted that the method for generating the interleaver and the de-interleaver is not unique. For example, the de-interleaver may be generated according to the generation process of the random interleaver, which is not limited in the present invention.

Step 202: receiving a random access request sent by the terminal device.

The random access request carries a preamble sequence for accessing the base station; the preamble sequence for accessing the base station is obtained by using an interleaved target preamble sequence; and the interleaved target preamble sequence is obtained by performing interleaving processing on a target preamble sequence by using one of the at least two interleavers, and the target preamble sequence is a preamble sequence in the set of preamble sequences.

In this step, when the terminal device triggers the random access, the base station may receive the random access request sent by the terminal device, and the random access request may carry the preamble sequence for accessing the base station.

Specifically, in an implementation manner, the preamble sequence for accessing the base station may be an interleaved target preamble sequence. In another implementation manner, the preamble sequence for accessing the base station is a random access channel subframe generated by performing time-frequency resource mapping on the interleaved target preamble sequence. In addition, the interleaved target preamble sequence is obtained by the terminal device performing interleaving processing on a target preamble sequence determined from a set of preamble sequences by using at least two interleavers, and the target preamble sequence is determined by the terminal device from a set of preamble sequences determined from a plurality of sets of preamble sequences as received.

Step 203: acquiring the preamble sequence for accessing the base station from the random access request.

In this step, the base station may acquire the preamble sequence for accessing the base station from the received random access request, so as to determine whether the terminal device can access the base station.

Specifically, when the preamble sequence is not a preamble sequence used by another terminal device that has accessed the base station, and passes the correlation detection, the terminal device may be allowed to access; when the preamble sequence is a preamble sequence used by another terminal device that has accessed the base station or fails to pass the correlation detection, the terminal device may not be allowed to access.

Step 204: determining that the accessing of the terminal device is not allowed, when the preamble sequence for accessing the base station is a preamble sequence used by another terminal device that has accessed the base station.

In this step, the base station may determine whether the preamble sequence for accessing the base station carried in the received random access request is a preamble sequence used by another terminal device of the accessed base station; if yes, it indicates that the preamble sequence for accessing the base station has been occupied by another terminal device, to avoid mutual interference, the terminal device that initiates the random access request is not allowed to access the base station; if not, it indicates that the preamble sequence for accessing the base station has been not occupied by another terminal device, and the base station may further perform correlation detection on the preamble sequence for accessing the base station to determine whether the terminal device that initiates the random access request is allowed to access the base station.

It can be seen that, in the interleave-based method for enhancing capacity of a random access channel provided by the embodiment of the present invention, the base station first sends a set of preamble sequences and at least two interleavers to a terminal device, so that the terminal device can generate a plurality of different interleaved preamble sequences from the same preamble sequence by performing interleaving processing on the preamble sequence, thus achieving the technical effect of generating more different preamble sequences by a limited preamble sequence. When the base station receives a random access request sent by the terminal device, if the target preamble sequence carried in the random access request is a preamble sequence used by another terminal device that has accessed the base station, the terminal device is not allowed to access to avoid mutual interference; if the target preamble sequence carried in the random access request is not a preamble sequence used by another terminal device that has accessed the base station, the terminal device is allowed to access. In this way, the base station can access more terminal devices that carry different preamble sequences, and improve the capacity of the PRACH even in a scenario where a large number of users initiate access; the problem of reducing the success rate of user access due to insufficient number of available preamble sequences can be avoided, and the user experience is improved.

Figure 3:
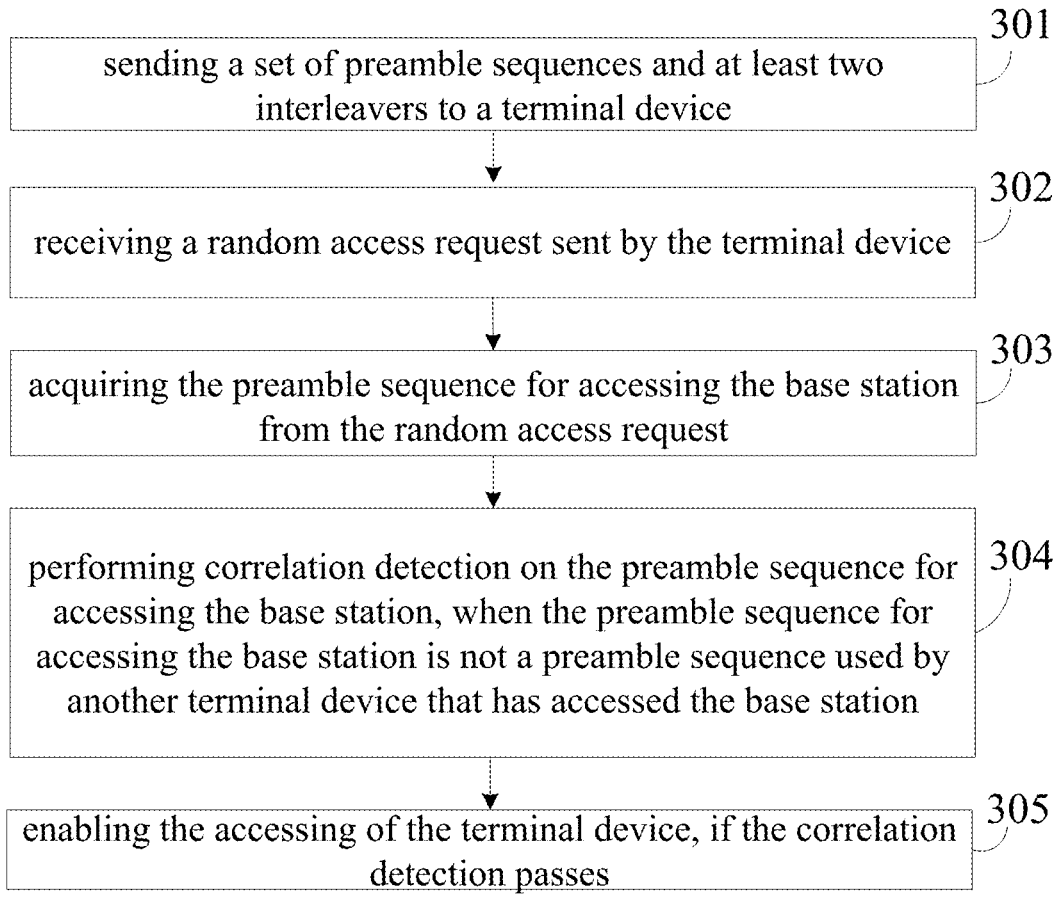
FIG. 3 is still another flowchart of an interleave-based method for enhancing capacity of a random access channel according to an embodiment of the present invention.

The embodiment of the invention further provides an interleave-based method for enhancing capacity of a random access channel, applied to a base station. Referring to FIG. 3, FIG. 3 is another flowchart of an interleave-based method for enhancing capacity of a random access channel according to an embodiment of the present invention, including the following steps:

Step 301: sending a set of preamble sequences and at least two interleavers to a terminal device.

For detailed procedures and technical effects of this step, reference may be made to step 201 in the interleave-based method for enhancing capacity of a random access channel shown in FIG. 2, and details are not described herein again.

Step 302: receiving a random access request sent by the terminal device.

For detailed procedures and technical effects of this step, reference may be made to step 202 in the interleave-based method for enhancing capacity of a random access channel shown in FIG. 2, and details are not described herein again.

Step 303: acquiring a preamble sequence for accessing the base station from the random access request.

For detailed procedures and technical effects of this step, reference may be made to step 203 in the interleave-based method for enhancing capacity of a random access channel shown in FIG. 2, and details are not described herein again.

Step 304: performing correlation detection on the preamble sequence for accessing the base station, when the preamble sequence for accessing the base station is not a preamble sequence used by another terminal device that has accessed the base station; if the correlation detection passes, step 305 is performed.

In this step, the base station may determine whether the preamble sequence for accessing the base station carried in the received random access request is a preamble sequence used by another terminal device of the accessed base station; if not, it indicates that the preamble sequence of the access base station is not occupied by another terminal device, and the base station may further perform correlation detection on the preamble sequence for accessing the base station to determine whether the terminal device that initiates the random access request is allowed to access the base station.

Figure 4:
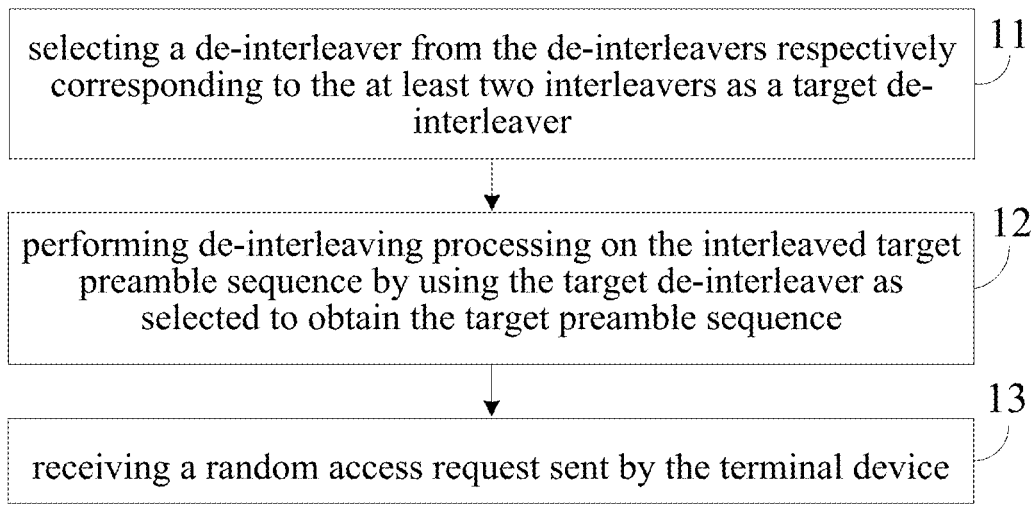
FIG. 4 is a specific flowchart of step 304 in the embodiment of the present invention.

In an implementation manner, when the preamble sequence for the accessing the base station that is received by the base station is the interleaved target preamble sequence, reference may be made to FIG. 4, where FIG. 4 is a specific flowchart of step 304 in the embodiment of the present invention. The step of performing correlation detection on the preamble sequence for accessing the base station in step 304 may include the following sub-steps:

Sub-step 11, selecting a de-interleaver from the de-interleaver respectively corresponding to the at least two interleavers as a target de-interleaver;

Sub-step 12, performing de-interleaving processing on the interleaved target preamble sequence by using the target de-interleaver as selected to obtain the target preamble sequence;

Sub-step 13, performing correlation detection on the target preamble sequence.

Specifically, take that performing interleaving processing on the interleaved target preamble sequence by using different random interleavers for an example. Since different random interleavers have different permutation rules, the sequences generated by employing different permutation rules on the same interleaved target preamble sequence are different from each other. During the de-interleaving, the derivation can be reversed according to the replacement rule, that is, the generation method, to obtain the de-interleaved sequence. The sequence before interleaving can be recovered only when the corresponding replacement rule is employed.

Next, the specific process of the correlation detection is as follows:

In the first step, according to formula (2), a maximum correlation peak $q_l$ between each preamble sequence $S_l$, l=1, 2, . . . , L in the set of preamble sequences P={$S_1$, $S_2$, . . . , $S_L$} and the de-interleaved target preamble sequence $\bar{s}_j$ is calculated, and the set of preamble sequences P={$S_1$, $S_2$, . . . , $S_L$} is a set of preamble sequences in which the target preamble sequence $\bar{s}_j$ is located.

$$q_l = \sum_{r=1}^{M} a_r b_r \quad (2)$$

In the formula (2), $a_r$ is the rth element in the target preamble sequence $\bar{s}_j$, $b_r$ is the rth element in the preamble sequence $S_l$, M is the length of the preamble sequence.

In the third step, the maximum value $q_{max}$ among the maximum correlation peaks $q_l$ is determined.

In the fourth step, it is determined whether the maximum value $q_{max}$ is greater than the correlation peak threshold $q_{th}$; if the maximum value $q_{max}$ is greater than the correlation peak threshold $q_{th}$, the correlation detection passes; if the maximum value $q_{max}$ is not greater than the correlation peak threshold the correlation detection fails.

It should be noted that, when the maximum value $q_{max}$ is greater than the correlation peak threshold $q_{th}$, it indicates that the target preamble sequence $S_j$ carried in the random access request received by the base station may be a preamble sequence in the set of preamble sequences sent by the base station to the terminal device. Therefore, the base station may access the terminal device that sends the random access request.

Figure 5:
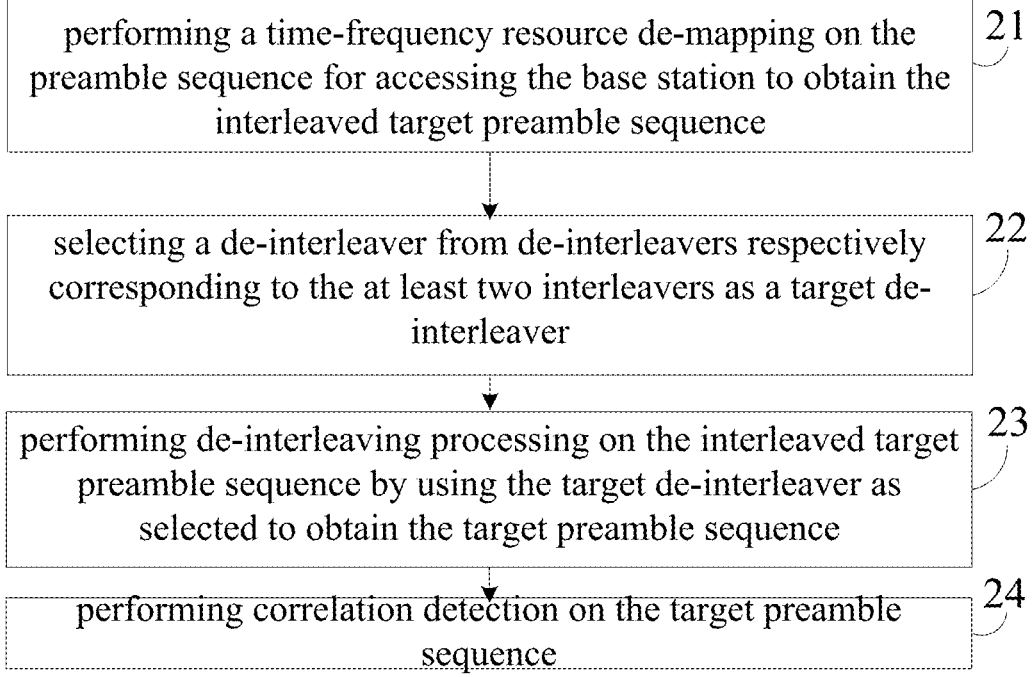
FIG. 5 is another specific flowchart of step 304 in the embodiment of the present invention.

In another implementation manner, when the preamble sequence used for accessing the base station carried in the random access request received by the base station is a random access channel subframe generated by performing time-frequency resource mapping on the interleaved target preamble sequence, referring to FIG. 5. FIG. 5 is still another specific flowchart of step 304 in the embodiment of the present invention. The step of performing correlation detection on the preamble sequence for accessing the base station in step 304 may include the following sub-steps:

Sub-step 21, performing a time-frequency resource de-mapping on the preamble sequence for accessing the base station to obtain the interleaved target preamble sequence.

The preamble sequence for accessing the base station is a random access channel subframe generated by performing time-frequency resource mapping on the interleaved target preamble sequence. Therefore, the time-frequency resource mapping inverse should be performed on the random access channel subframe to obtain the interleaved target preamble sequence.

It should be noted that the detailed processing of the time-frequency resource de-mapping may refer to the prior art, and details are not described herein again.

Sub-step 22, selecting a de-interleaves from de-interleavers respectively corresponding to the at least two interleavers as a target de-interleaver.

Sub-step 23, performing de-interleaving processing on the interleaved target preamble sequence by using the target de-interleaver as selected to obtain the target preamble sequence.

Sub-step 24, performing correlation detection on the target preamble sequence.

Specifically, sub-steps 22 to 24 may refer to sub-steps 11 to 13 in a specific flowchart of step 304 shown in FIG. 4, and details are not described herein again.

Step 305: enabling the accessing of the terminal device.

In this step, when the preamble sequence for accessing the base station carried in the random access request received by the base station is not occupied by another terminal device, and the correlation detection performed by the base station on the preamble sequence for accessing the base station passes, the terminal device that initiated the random access request may be allowed to access the base station.

It can be seen that, in the interleave-based method for enhancing capacity of a random access channel provided by the embodiment of the present invention, the base station first sends a set of preamble sequences and at least two interleavers to the terminal device, so that the terminal device can generate a plurality of different interleaved preamble sequences from the same preamble sequence by performing interleaving processing on the preamble sequence, thus achieving the technical effect of generating more different preamble sequences by a limited preamble sequence. When the base station receives the random access request sent by the terminal device, the target preamble sequences obtained from the random access request are different interleaved preamble sequences, so that the base station can access more terminal devices and improve the PRACH, even in a scenario where a large number of users initiate access, the problem of reducing the success rate of user access due to insufficient number of available preamble sequences can be avoided, and the user experience is improved.

Figure 6:
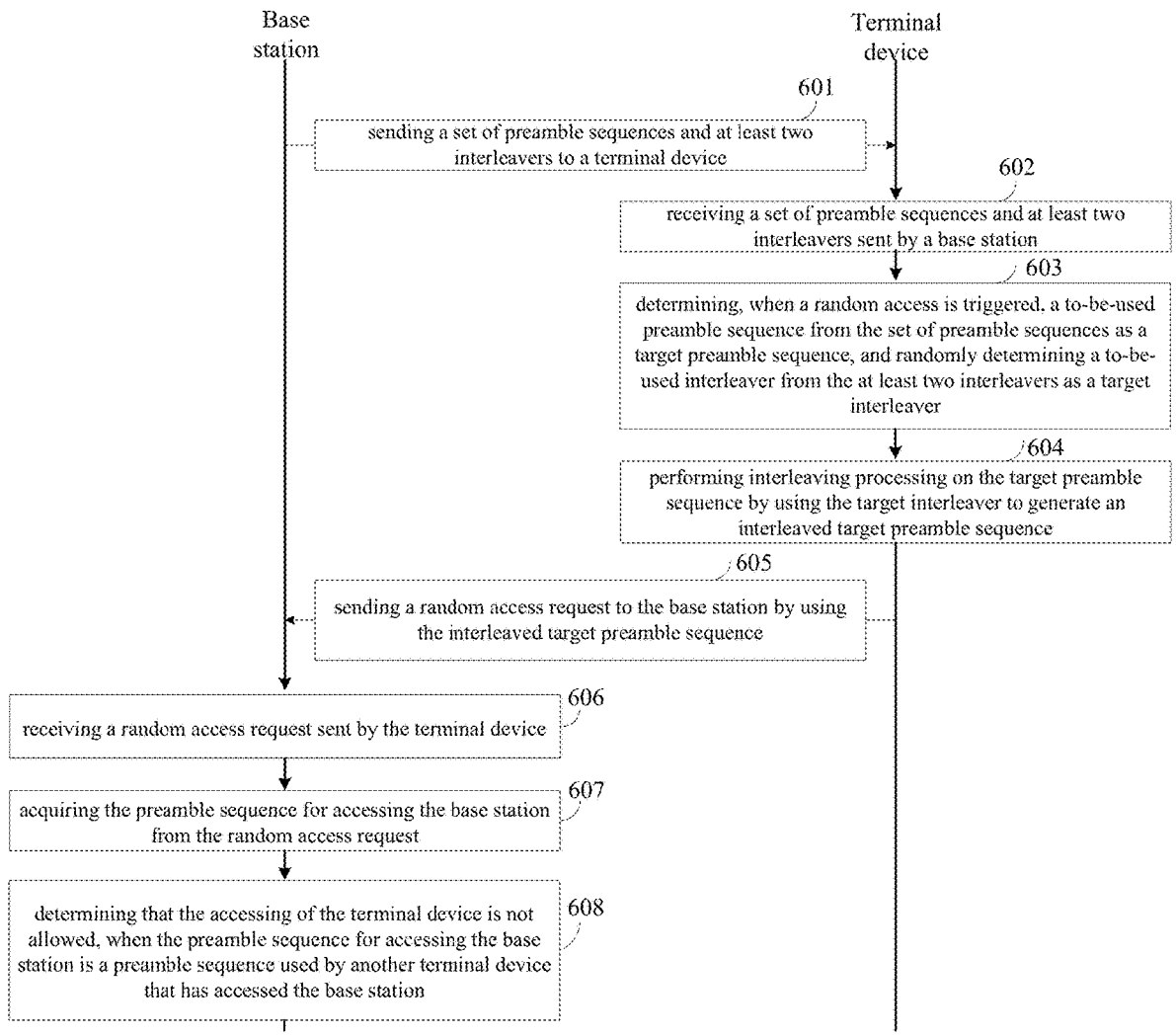
FIG. 6 is still another flowchart of an interleave-based method for enhancing capacity of a random access channel according to an embodiment of the present invention.

The embodiment of the present invention further provides an interleave-based method for enhancing capacity of a random access channel, the method is more clearly described in combination with the processing procedure at the base station side and the terminal device. Referring to FIG. 6, FIG. 6 is still another flowchart of an interleave-based method for enhancing capacity of a random access channel according to an embodiment of the present invention, including the following steps:

Step 601: the base station sends a set of preamble sequences and at least two interleavers to a terminal device.

In this step, the base station may notify a plurality of sets of preamble sequences and at least two interleavers provided to the terminal device for use, to the terminal device residing in the cell through a system message, so that the terminal device determines a set of preamble sequences and a target interleaver to be used such that the terminal device can perform interleaving processing on the target preamble sequence as determined from the set of preamble sequences by using the target interleaver.

Step 602: the terminal device receives the set of preamble sequences and at least two interleavers sent by the base station.

In this step, the terminal device receives the set of preamble sequences and at least two interleavers from the base station to perform interleaving processing on the preamble sequence by using the interleavers to generate a plurality of different preamble sequences, thereby improving the capacity of the PRACH.

Step 603: when a random access is triggered, the terminal device determines a to-be-used preamble sequence from the set of preamble sequences as a target preamble sequence, and randomly determines a to-be-used interleaver from at least two interleavers as a target interleaver.

In this step, when a random access to a terminal device is triggered, the terminal device may determine a set of preamble sequences from the plurality sets of preamble sequences as received according to the value of the Msg3 to be sent and the value of the path loss, and further determine from the determined set of preamble sequences, a to-be-used preamble sequence, that is, a target preamble sequence; the terminal device may further randomly determine, a to-be-used interleaver, that is, a target interleaver, from the at least two interleavers as received, thus perform the subsequent step that performing interleaving processing on the target preamble sequence by using the target interleaver.

Step 604: the terminal device performs interleaving processing on the target preamble sequence by using a target interleaver to generate an interleaved target preamble sequence.

In this step, after the terminal device determines the target preamble sequence and the target interleaver, the target interleaver may be used to perform interleaving processing on the target preamble sequence to generate an interleaved target preamble sequence; it should be noted that, for the same preamble sequence, when interleaving is performed using different interleavers, the generated interleaved preamble sequences are also different, so that more different interleaved preamble sequences can be generated from the limited preamble sequence, so that more terminal devices can use the interleaved preamble sequence to access the base station, thus improving the capacity of the PRACH.

Step 605: the terminal device sends a random access request to the base station by using the interleaved target preamble sequence.

In this step, the terminal device may use the interleaved target preamble sequence to send a random access request to the base station to access the base station.

Step 606: the base station receives a random access request sent by the terminal device.

In this step, when a random access to the terminal device is triggered, the base station may receive the random access request sent by the terminal device, and the random access request may carry the preamble sequence for accessing the base station.

Step 607: the base station acquires a preamble sequence for accessing the base station from the random access request.

In this step, the base station may acquire a preamble sequence for accessing the base station from the received random access request, so as to determine whether the terminal device can access the base station.

Step 608: determining that the accessing of the terminal device is not allowed, when the base station determines that the preamble sequence for accessing the base station is a preamble sequence used by another terminal device that has accessed the base station.

In this step, the base station may determine whether the preamble sequence for accessing the base station carried in the received random access request is a preamble sequence used by another terminal device that has accessed the base station; if yes, it indicates that the preamble sequence for accessing the base station has been occupied by another terminal device, to avoid mutual interference, the terminal device that initiates the random access request is not allowed to access the base station; if not, it indicates that the preamble sequence for accessing the base station has been not occupied by another terminal device, and the base station may further perform correlation detection on the preamble sequence for accessing the base station to determine whether the terminal device that initiates the random access request is allowed to access the base station.

It should be noted that the detailed processing procedure and technical effects of the steps 601 to 608 may refer to the interleave-based method for enhancing capacity of a random access channel shown in FIG. 1 to FIG. 5, and details are not described herein again.

It can be seen that, in the interleave-based method for enhancing capacity of a random access channel provided by the embodiment of the present invention, the base station first sends a set of preamble sequences and at least two interleavers to the terminal device, so that the terminal device can generate a plurality of different interleaved preamble sequences from the same preamble sequence by performing interleaving processing on the preamble sequence, thus achieving the technical effect of generating more different preamble sequences by a limited preamble sequence. When the base station receives the random access request sent by the terminal device, the target preamble sequences obtained from the random access request are different interleaved preamble sequences, so that the base station can access more terminal devices and improve the PRACH, even in a scenario where a large number of users initiate access, the problem of reducing the success rate of user access due to insufficient number of available preamble sequences can be avoided, and the user experience is improved.

Figure 7:
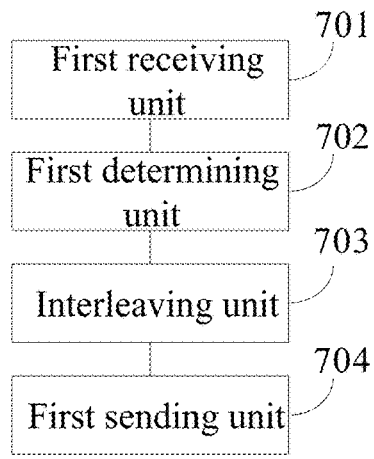
FIG. 7 is a structural diagram of an interleave-based apparatus for enhancing capacity of a random access channel according to an embodiment of the present invention.

The embodiment of the invention further provides an interleave-based apparatus for enhancing capacity of a random access channel. Referring to FIG. 7, FIG. 7 is a structural diagram of an interleave-based apparatus for enhancing capacity of a random access channel capacity according to an embodiment of the present invention, where the apparatus includes:

a first receiving unit 701, configured to receive a set of preamble sequences and at least two interleavers sent by a base station;

a first determining unit 702, configured to determine, when a random access is triggered, a to-be-used preamble sequence from the set of preamble sequences as a target preamble sequence, and randomly determine a to-be-used interleaver from the at least two interleavers as a target interleaver;

an interleaving unit 703, configured to perform interleaving processing on the target preamble sequence by using the target interleaver to generate an interleaved target preamble sequence, wherein, performing interleaving processing on the same preamble sequence by using different interleavers will generate different interleaved preamble sequences;

a first sending unit 704, configured to send a random access request to the base station by using the interleaved target preamble sequence, where the random access request carries a preamble sequence for accessing the base station.

Optionally, a correlation peak between the interleaved preamble sequences generated after performing interleaving processing on the same preamble sequence by using different interleavers is smaller than a preset correlation peak threshold.

Optionally, the first sending unit 704 is configured to send, to the base station, a random access request that carries a preamble sequence for accessing the base station, where the preamble sequence for accessing the base station is an interleaved target preamble sequence; or perform a time-frequency resource mapping on the interleaved target preamble sequence to generate a random access channel subframe; and send a random access request carrying a preamble sequence for accessing the base station to the base station, where the preamble sequence for accessing the base station is the random access channel subframe.

It can be seen that, according to the interleave-based apparatus for enhancing the capacity of a random access channel provided by the embodiment of the present invention, the terminal device can generate a plurality of different interleaved preamble sequences from the same preamble sequence by performing interleaving processing on the preamble sequence, thus achieving the technical effect of generating more different preamble sequences by a limited preamble sequence, such that the base station can access more terminal devices and improve the capacity of the PRACH, even in a scenario where a large number of users initiate access, the problem of reducing the success rate of user access due to insufficient number of available preamble sequences can be avoided, and the user experience is improved.

Figure 8:
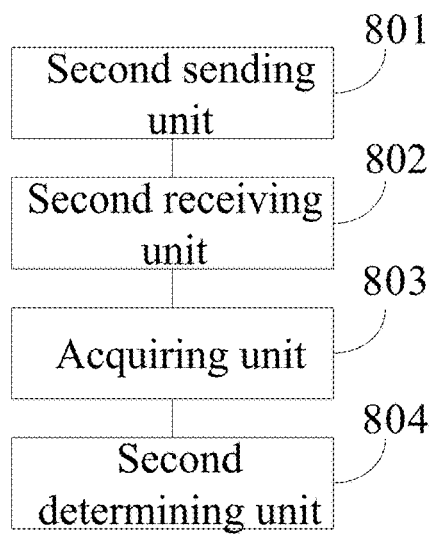
FIG. 8 is another structural diagram of an interleave-based apparatus for enhancing capacity of a random access channel according to an embodiment of the present invention.

An embodiment of the invention further provides an interleave-based apparatus for enhancing capacity of a random access channel. Referring to FIG. 8, FIG. 8 is still another structural diagram of an interleave-based apparatus for enhancing capacity of a random access channel according to an embodiment of the present invention, where the apparatus includes:

a second sending unit 801, configured to send a set of preamble sequences and at least two interleavers to a terminal device;

a second receiving unit 802, configured to receive a random access request sent by the terminal device, where the random access request carries a preamble sequence for accessing the base station;

an acquiring unit 803, configured to acquire the preamble sequence for accessing the base station from the random access request, where the preamble sequence for accessing the base station is obtained by using an interleaved preamble sequence, the interleaved preamble sequence is obtained by performing interleaving processing on a target preamble sequence by using one of the at least two interleavers, and the target preamble sequence is a preamble sequence in the set of preamble sequences;

a second determining unit 804, configured to determine that the accessing of the terminal device is not allowed, when the preamble sequence for accessing the base station is a preamble sequence used by another terminal device that has accessed the base station.

Optionally, the device further includes:

a correlation detecting unit, configured to perform correlation detection on the preamble sequence for accessing the base station, when the preamble sequence for accessing the base station is not a preamble sequence used by another terminal device that has accessed the base station;

an access unit, configured to enable the accessing of the terminal device if the correlation detection passes.

Optionally, the preamble sequence for accessing the base station is an interleaved target preamble sequence.

The correlation detecting unit includes: a first selecting subunit, a first de-interleaving subunit, and a first correlation detecting subunit;

the first selecting subunit is configured to select a de-interleaver as a target de-interleaver from the de-interleavers respectively corresponding to the at least two in-terleavers;

the first de-interleaving subunit is configured to perform de-interleaving processing on the interleaved target preamble sequence by using the target de-interleaver as selected to obtain the target preamble sequence;

the first correlation detection sub-unit is configured to perform correlation detection on the target preamble sequence.

Optionally, the preamble sequence for accessing the base station is a random access channel subframe generated by performing time-frequency resource mapping on the interleaved target preamble sequence.

The correlation detecting unit includes: a time-frequency resource de-mapping sub-unit, a second selecting sub-unit, a second de-interleaving sub-unit, and a second correlation detecting sub-unit;

the time-frequency resource de-mapping sub-unit is configured to perform time-frequency resource de-mapping on the preamble sequence for accessing the base station, to obtain an interleaved target preamble sequence;

the second selection subunit is configured to select a de-interleaver as a target de-interleaver from the de-interleavers corresponding to the at least two interleavers respectively;

the second de-interleaving subunit is configured to per-forming de-interleaving processing on the interleaved target preamble sequence by using the target de-interleaver as selected to obtain the target preamble sequence;

the second correlation detection sub-unit is configured to perform correlation detection on the target preamble sequence.

Optionally, the interleaver includes a nested interleaver; the interleaver is generated by triggering the following units:

a generating unit, configured to generate a mother interleaver and a mother de-interleaver corresponding to the mother interleaver;

a first nesting unit, configured to generate a new interleaver by nesting based on the mother interleaver;

a second nesting unit, configured to generate a new de-interleaver by nesting based on the mother de-interleaver.

It can be seen that, according to the interleave-based apparatus for enhancing capacity of a random access channel, the base station first sends a set of preamble sequences and at least two interleavers to a terminal device, so that the terminal device can generate a plurality of different interleaved preamble sequences from the same preamble sequence by performing interleaving processing on the preamble sequence, thus achieving the technical effect of generating more different preamble sequences by a limited preamble sequence. When the base station receives the random access request sent by the terminal device, the target preamble sequences obtained from the random access request are different interleaved preamble sequences, so that the base station can access more terminal devices and improve the PRACH, even in a scenario where a large number of users initiate access, the problem of reducing the success rate of user access due to insufficient number of available preamble sequences can be avoided, and the user experience is improved.

Figure 9:
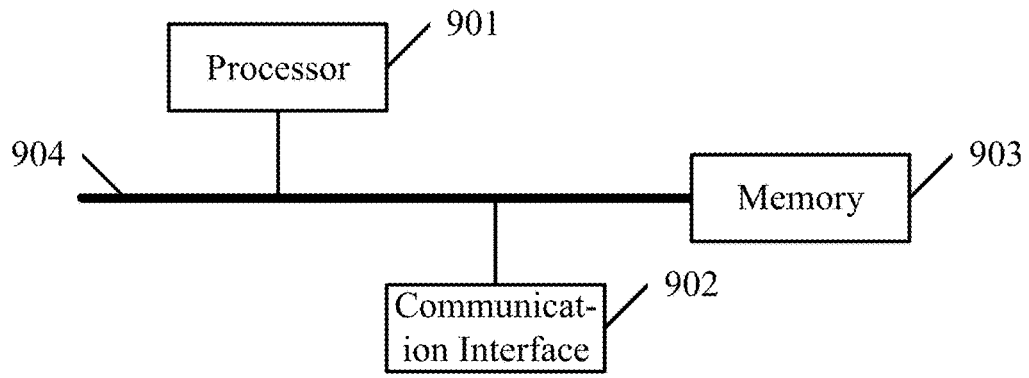
FIG. 9 is a schematic diagram of an electronic device according to an embodiment of the present invention.

An embodiment of the present invention further provides an electronic device. Referring to FIG. 9, FIG. 9 is a schematic diagram of the electronic device according to the embodiment of the present invention. As shown in FIG. 9, the electronic device includes a processor 901, a communication interface 902, and a memory 903, and a communication bus 904, wherein the processor 901, the communication interface 902, and the memory 903 complete communication with each other through the communication bus 904, wherein the memory 903 is configured to store a computer program;

the processor 901 is configured to perform the following steps when executing the program stored on the memory 903:

receiving a set of preamble sequences sent by a base station and at least two interleavers;

determining, when a random access is triggered, a to-be-used preamble sequence from the set of preamble sequences as a target preamble sequence, and randomly determining a to-be-used interleaver from the at least two interleavers as a target interleaver;

performing interleaving processing on the target preamble sequence by using the target interleaver to generate an interleaved target preamble sequence, wherein, performing interleaving processing on the same preamble sequence by using different interleavers will generate different interleaved preamble sequences;

sending a random access request to the base station by using the interleaved target preamble sequence, where the random access request carries a preamble sequence for accessing the base station.

It can be seen that, in the electronic device provided by the embodiment of the present invention, the terminal device can generate a plurality of different interleaved preamble sequences from the same preamble sequence by performing interleaving processing on the preamble sequence, thus achieving the technical effect of generating more different preamble sequences by a limited preamble sequence, such that the base station can access more terminal devices and improve the capacity of the PRACH, even in a scenario where a large number of users initiate access, the problem of reducing the success rate of user access due to insufficient number of available preamble sequences can be avoided, and the user experience is improved.

Figure 10:
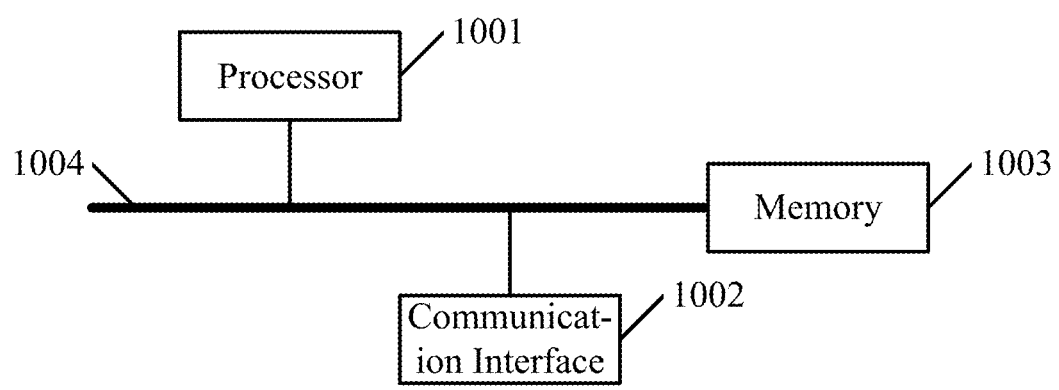
FIG. 10 is a schematic diagram of an electronic device according to an embodiment of the present invention.

An embodiment of the present invention further provides an electronic device. Referring to FIG. 10, FIG. 10 is still another schematic diagram of the electronic device according to the embodiment of the present invention. As shown in FIG. 10, the electronic device includes a processor 1001, a communication interface 1002, and a memory. 1003 and a communication bus 1004, wherein the processor 1001, the communication interface 1002, and the memory 1003 complete communication with each other through the communication bus 1004, wherein the memory 1003 is configured to store a computer program;

the processor 1001 is configured to perform the following steps when executing the program stored on the memory 1003:

sending a set of preamble sequences and at least two interleavers to a terminal device;

receiving a random access request sent by the terminal device, where the random access request carries a preamble sequence for accessing the base station;

acquiring the preamble sequence for accessing the base station from the random access request, where the preamble sequence for accessing the base station is obtained by using an interleaved preamble sequence, the interleaved preamble sequence is obtained by performing interleaving processing on a target preamble sequence by using one of the at least two interleavers, and the target preamble sequence is a preamble sequence in the set of preamble sequences;

determining that the accessing of the terminal device is not allowed, when the preamble sequence for accessing the base station is a preamble sequence used by another terminal device that has accessed the base station.

It can be seen that, in the electronic device provided by the embodiment of the present invention, the base station first sends a set of preamble sequences and at least two interleavers to the terminal device, so that the terminal device can generate a plurality of different interleaved preamble sequences from the same preamble sequence by performing interleaving processing on the preamble sequence, thus achieving the technical effect of generating more different preamble sequences by a limited preamble sequence. When the base station receives the random access request sent by the terminal device, the target preamble sequences obtained from the random access request are different interleaved preamble sequences, so that the base station can access more terminal devices and improve the PRACH, even in a scenario where a large number of users initiate access, the problem of reducing the success rate of user access due to insufficient number of available preamble sequences can be avoided, and the user experience is improved.

The communication bus mentioned in the above electronic device may be a Peripheral Component Interconnect (PCI) bus or an Extended Industry Standard Architecture (EISA) bus. The communication bus can be divided into an address bus, a data bus, a control bus, and the like. For ease of representation, only one thick line is shown in the figure, but it does not mean that there is only one bus or one type of bus.

The communication interface is used for communication between the above electronic device and other devices.

The memory may include a random access memory (RAM), and may also include a non-volatile memory (NVM), such as at least one disk storage. Optionally, the memory may also be at least one storage device located away from the aforementioned processor.

The processor may be a general-purpose processor, including a central processing unit (CPU), a network processor (NP), or a digital signal processor (DSP), an Application Specific Integrated Circuit (ASIC), a Field-Programmable Gate Array (FPGA) or other programmable logic devices, discrete gate or transistor logic device, discrete hardware component.

In still another embodiment provided by the present invention, there is provided a computer readable storage medium having stored therein instructions that, when run on a computer, cause the computer to perform the interleave-based method for enhancing capacity of a random access channel according to any of the above embodiments.

In still another embodiment provided by the present invention, there is also provided a computer program product comprising instructions which, when executed on a computer, cause the computer to perform the interleave-based method for enhancing capacity of a random access channel according to any of the above embodiments.

In the above embodiments, it may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions described in accordance with embodiments of the present invention are generated in whole or in part. The computer can be a general purpose computer, a special purpose computer, a computer network, or other programmable device. The computer instructions can be stored in a computer readable storage medium or transferred from one computer readable storage medium to another computer readable storage medium, for example, the computer instructions can be transmitted from a website site, computer, server or data center to another website site, computer, server or data center via wired (e.g. coaxial cable, fiber optic, digital subscriber line DSL) or wireless (e.g. infrared, wireless, microwave, etc.). The computer readable storage medium can be any available media that can be accessed by a computer or a data storage device such as a server, data center, or the like that includes one or more available media. The usable medium may be a magnetic medium (e.g., a floppy disk, a hard disk, a magnetic tape), an optical medium (e.g., a DVD), or a semiconductor medium (e.g., a solid state hard disk SSD) or the like.

It should be noted that the relationship terms herein, such as "first", "second", and the like are only configured to distinguish one entity or operation from another entity or operation, but do not necessarily require or imply that there is actual relationship or order between these entities or operations. Moreover, the terms "include", "comprise", or any variants thereof are intended to cover a non-exclusive inclusion, such that processes, methods, articles, or devices, including a series of elements, include not only those elements listed, but also other elements not specifically listed or the elements intrinsic to these processes, methods, articles, or devices. Without further limitations, elements limited by the wording "comprise(s) a/an . . . " do not exclude additional identical elements in the processes, methods, articles, or devices, including the listed elements.

Various embodiments in the description are all described in a correlated manner, and references to each other can be made for the same or similar parts between various embodiments, the description for each embodiment focuses on the differences between them.

What is claimed is:

1. An interleave-based method for enhancing capacity of a random access channel, applied to a terminal device, the method comprises:

receiving a set of preamble sequences and at least two interleavers sent by a base station;

determining, when a random access is triggered, a to-be-used preamble sequence from the set of preamble sequences as a target preamble sequence, and randomly determining a to-be-used interleaver from the at least two interleavers as a target interleaver;

performing interleaving processing on the target preamble sequence by using the target interleaver to generate an interleaved target preamble sequence, wherein, performing interleaving processing on the same preamble sequence by using different interleavers will generate different interleaved preamble sequences;

sending a random access request to the base station by using the interleaved target preamble sequence, where the random access request carries a preamble sequence for accessing the base station;

wherein the interleaver comprises a nested interleaver and the interleaver is generated by performing the following steps:

generating a mother interleaver and a mother de-interleaver corresponding to the mother interleaver;

generating a new interleaver by nesting based on the mother interleaver; and generating a new de-interleaver by nesting based on the mother de-interleaver.

2. The method of claim 1, wherein, a correlation peak between the interleaved preamble sequences generated after performing interleaving processing on the same preamble sequence by using different interleavers is smaller than a preset correlation peak threshold.

3. The method of claim 1, wherein, sending a random access request to the base station by using the interleaved target preamble sequence comprises:

sending a random access request carrying a preamble sequence for accessing the base station to the base station, where the preamble sequence for accessing the base station is the interleaved target preamble sequence; or performing a time-frequency resource mapping on the interleaved target preamble sequence to generate a random access channel subframe, and sending a random access request carrying a preamble sequence for accessing the base station to the base station, where the preamble sequence for accessing the base station is the random access channel subframe.

4. An interleave-based method for enhancing capacity of a random access channel, applied to a base station, the method comprises:

sending a set of preamble sequences and at least two interleavers to a terminal device;

receiving a random access request sent by the terminal device, where the random access request carries a preamble sequence for accessing the base station;

acquiring the preamble sequence for accessing the base station from the random access request, where the preamble sequence for accessing the base station is obtained by using an interleaved preamble sequence, the interleaved preamble sequence is obtained by performing interleaving processing on a target preamble sequence by using one of the at least two interleavers, and the target preamble sequence is a preamble sequence in the set of preamble sequences;

determining that the accessing of the terminal device is not allowed, when the preamble sequence for accessing the base station is a preamble sequence used by another terminal device that has accessed the base station;

wherein the interleaver comprises a nested interleaver and the interleaver is generated by performing the following steps:

generating a mother interleaver and a mother de-interleaver corresponding to the mother interleaver;

generating a new interleaver by nesting based on the mother interleaver; and generating a new de-interleaver by nesting based on the mother de-interleaver.

5. The method of claim 4, wherein, the method further comprises:

performing correlation detection on the preamble sequence for accessing the base station, when the preamble sequence for accessing the base station is not a preamble sequence used by another terminal device that has accessed the base station;

enabling the accessing of the terminal device, if the correlation detection passes.

6. The method of claim 5, wherein the preamble sequence for accessing the base station is the interleaved target preamble sequence;

performing correlation detection on the preamble sequence for accessing the base station comprises:

selecting a de-interleaver from the de-interleavers respectively corresponding to the at least two interleavers as a target de-interleaver;

performing de-interleaving processing on the interleaved target preamble sequence by using the target de-interleaver as selected to obtain the target preamble sequence;

performing correlation detection on the target preamble sequence.

7. The method of claim 5, wherein the preamble sequence for accessing the base station is a random access channel subframe generated by performing time-frequency resource mapping on the interleaved target preamble sequence;

performing correlation detection on the preamble sequence for accessing the base station comprises:

performing a time-frequency resource de-mapping on the preamble sequence for accessing the base station to obtain the interleaved target preamble sequence;

selecting a de-interleaver from de-interleavers respectively corresponding to the at least two interleavers as a target de-interleaver;

performing de-interleaving processing on the interleaved target preamble sequence by using the target de-interleaver as selected to obtain the target preamble sequence;

performing correlation detection on the target preamble sequence.

8. An interleave-based apparatus for enhancing capacity of a random access channel, applied to a terminal device, and the apparatus comprises:

a first receiving unit, configured to receive a set of preamble sequences and at least two interleavers sent by a base station;

a first determining unit, configured to determine, when a random access is triggered, a to-be-used preamble sequence from the set of preamble sequences as a target preamble sequence, and randomly determine a to-be-used interleaver from the at least two interleavers as a target interleaver;

an interleaving unit, configured to perform interleaving processing on the target preamble sequence by using the target interleaver to generate an interleaved target preamble sequence, wherein, performing interleaving processing on the same preamble sequence by using different interleavers will generate different interleaved preamble sequences;

a first sending unit, configured to send a random access request to the base station by using the interleaved target preamble sequence, where the random access request carries a preamble sequence for accessing the base station;

wherein the interleaver comprises a nested interleaver and the interleaver is generated by performing the following steps:

generating a mother interleaver and a mother de-interleaver corresponding to the mother interleaver;

generating a new interleaver by nesting based on the mother interleaver; and generating a new de-interleaver by nesting based on the mother de-interleaver.

9. An interleaver-based apparatus for enhancing capacity of a random access channel, applied to a base station, and the apparatus comprises:

a second sending unit, configured to send a set of preamble sequences and at least two interleavers to the terminal device;

a second receiving unit, configured to receive a random access request sent by the terminal device, where the random access request carries a preamble sequence for accessing the base station;

an acquiring unit, configured to acquire the preamble sequence for accessing the base station from the random access request, where the preamble sequence for accessing the base station is obtained by using an interleaved preamble sequence, the interleaved preamble sequence is obtained by performing interleaving processing on a target preamble sequence by using one of the at least two interleavers, and the target preamble sequence is a preamble sequence in the set of preamble sequences;

a second determining unit, configured to determine that the accessing of the terminal device is not allowed, when the preamble sequence for accessing the base station is a preamble sequence used by another terminal device that has accessed the base station;

wherein the interleaver comprises a nested interleaver and the interleaver is generated by performing the following steps:

generating a mother interleaver and a mother de-interleaver corresponding to the mother interleaver;

generating a new interleaver by nesting based on the mother interleaver; and generating a new de-interleaver by nesting based on the mother de-interleaver.

* * * * *